US011121762B2

(12) United States Patent
Brown

(10) Patent No.: US 11,121,762 B2
(45) Date of Patent: Sep. 14, 2021

(54) DISPLACEABLE SIGNAL RELAY NODE PACKAGE

(71) Applicant: Set Point Solutions, LLC, Tampa, FL (US)

(72) Inventor: Joseph Harrington Matanane Brown, Barrigada, GU (US)

(73) Assignee: Set Point Solutions, LLC, Tampa, FL (US)

(*) Notice: Subject to any disclaimer, the term of this patent is extended or adjusted under 35 U.S.C. 154(b) by 0 days.

(21) Appl. No.: 16/989,484

(22) Filed: Aug. 10, 2020

(65) Prior Publication Data

US 2020/0373997 A1   Nov. 26, 2020

Related U.S. Application Data

(63) Continuation of application No. 15/975,395, filed on May 9, 2018, now Pat. No. 10,742,307.

(60) Provisional application No. 62/603,659, filed on Jun. 8, 2017.

(51) Int. Cl.
| | | |
|---|---|---|
| H04B 7/14 | (2006.01) | |
| H04B 7/185 | (2006.01) | |
| B64D 17/76 | (2006.01) | |
| B64C 39/02 | (2006.01) | |
| F42B 12/36 | (2006.01) | |
| F42B 15/08 | (2006.01) | |

(52) U.S. Cl.
CPC ....... *H04B 7/18502* (2013.01); *B64C 39/024* (2013.01); *B64C 39/028* (2013.01); *B64D 17/76* (2013.01); *F42B 12/365* (2013.01); *B64C 2201/122* (2013.01); *F42B 15/08* (2013.01)

(58) Field of Classification Search
CPC . H04B 7/18502; B64C 39/024; B64C 39/028; B64C 2201/122; B64D 17/76; F42B 12/365; F42B 15/08
USPC ............................................................ 455/7
See application file for complete search history.

(56) References Cited

U.S. PATENT DOCUMENTS

| | | | |
|---|---|---|---|
| 3,721,410 A | 3/1973 | Anspacher | |
| 3,962,537 A | 6/1976 | Kears et al. | |
| 4,776,277 A * | 10/1988 | Fiedler et al. ......... | G01R 31/50 102/293 |

(Continued)

FOREIGN PATENT DOCUMENTS

| | | |
|---|---|---|
| FR | 2759775 A1 | 8/1998 |
| WO | WO2018226412 A1 | 12/2018 |

OTHER PUBLICATIONS

"International Search Report" and "Written Opinion of the International Searching Authority." Patent Cooperation Treaty Application No. PCT/US2018/034203, dated Aug. 7, 2018, 10 pages.

*Primary Examiner* — April G Gonzales
(74) *Attorney, Agent, or Firm* — Middleton Reutlinger

(57) ABSTRACT

The present disclosure describes a signal relay node that is physically displaceable by a delivery system to move the signal relay node to a different location, to enable the signal relay node to overcome physical obstructions to signal propagation. A delivery system, such as a launching system, can launch the signal relay node encased within a housing unit, such as a projectile cap. Upon launch into the air, an additional aloft package may provide an aerostat, parachute, and/or a propeller and motor system to keep the signal relay node aloft in the air for a longer period of time.

13 Claims, 17 Drawing Sheets

(56) References Cited

U.S. PATENT DOCUMENTS

| | | | | |
|---|---|---|---|---|
| 4,893,815 A * | 1/1990 | Rowan | F41B 15/04 | 42/1.08 |
| 4,969,397 A | 11/1990 | Gunther et al. | | |
| 5,050,501 A * | 9/1991 | Barditch | F42B 35/00 | 102/293 |
| 5,198,612 A * | 3/1993 | Myers | F42C 21/00 | 102/293 |
| 5,408,681 A | 4/1995 | Ressler et al. | | |
| 5,813,278 A * | 9/1998 | Schabdach | F41A 31/00 | 73/167 |
| 6,037,899 A * | 3/2000 | Weber | F41G 3/142 | 244/3.2 |
| 6,766,950 B2 * | 7/2004 | Hall | G06F 1/1635 | 235/400 |
| 6,903,676 B1 * | 6/2005 | Frady | F41H 11/00 | 342/52 |
| 6,923,404 B1 * | 8/2005 | Liu | B64C 5/12 | 244/46 |
| 7,478,595 B1 * | 1/2009 | Herr | F42C 11/065 | 102/235 |
| 7,645,643 B2 * | 1/2010 | Hiramoto | H01L 33/58 | 438/127 |
| 8,220,392 B1 * | 7/2012 | Maldonado | F42B 14/00 | 102/368 |
| 8,515,409 B2 * | 8/2013 | Ramo | H04W 4/06 | 455/418 |
| 8,939,056 B1 * | 1/2015 | Neal, III | B64D 17/80 | 89/1.51 |
| 9,234,728 B2 * | 1/2016 | Akcasu | B64D 17/00 | |
| 9,500,454 B1 * | 11/2016 | Decker | F42B 30/10 | |
| 9,527,596 B1 * | 12/2016 | Adams | B64C 39/024 | |
| 9,738,383 B2 * | 8/2017 | Adams | B64C 39/024 | |
| 9,823,070 B2 * | 11/2017 | Stephens, Jr. | H04N 5/23203 | |
| 10,027,397 B2 * | 7/2018 | Kim | H04B 7/15 | |
| 2005/0051667 A1 * | 3/2005 | Arlton | G08B 13/19621 | 244/17.11 |
| 2007/0009859 A1 * | 1/2007 | Preston | F41A 33/00 | 434/11 |
| 2008/0276821 A1 * | 11/2008 | Stancil | F42B 12/365 | 102/502 |
| 2008/0300055 A1 * | 12/2008 | Lutnick | G07F 17/32 | 463/39 |
| 2009/0053678 A1 * | 2/2009 | Falkenhayn | F42B 12/387 | 434/16 |
| 2009/0217836 A1 * | 9/2009 | Dietrich | F42C 11/002 | 102/215 |
| 2010/0093270 A1 * | 4/2010 | Bass | H04K 3/92 | 455/1 |
| 2010/0147177 A1 * | 6/2010 | Van Stratum | F42C 19/083 | 102/470 |
| 2011/0174922 A1 * | 7/2011 | Berman | F41H 11/04 | 244/1 TD |
| 2012/0211589 A1 * | 8/2012 | Uzman | F42B 15/01 | 244/3.13 |
| 2012/0286951 A1 * | 11/2012 | Hess | G08B 25/14 | 340/539.1 |
| 2014/0163664 A1 * | 6/2014 | Goldsmith | A61B 17/12181 | 623/1.11 |
| 2014/0284422 A1 * | 9/2014 | Sapir | B64B 1/62 | 244/96 |
| 2015/0128823 A1 * | 5/2015 | Akcasu | F42B 12/365 | 102/517 |
| 2016/0011318 A1 * | 1/2016 | Cohen | G01S 19/45 | 342/357.26 |
| 2016/0091285 A1 * | 3/2016 | Mason | F41J 5/06 | 273/372 |
| 2016/0236638 A1 * | 8/2016 | Lavie | H04N 7/185 | |
| 2017/0069214 A1 * | 3/2017 | Dupray | G08G 5/0013 | |
| 2017/0146324 A1 * | 5/2017 | Mcfadyen | F41J 7/04 | |

* cited by examiner

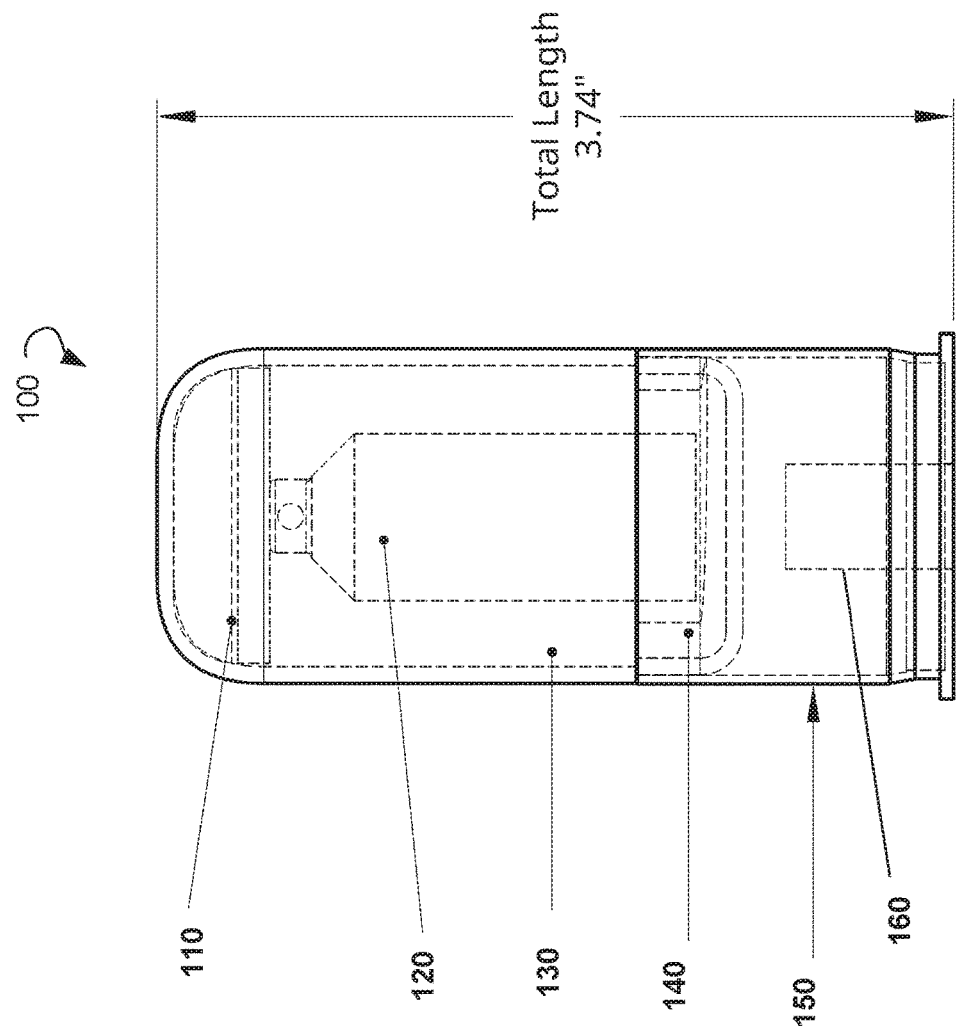
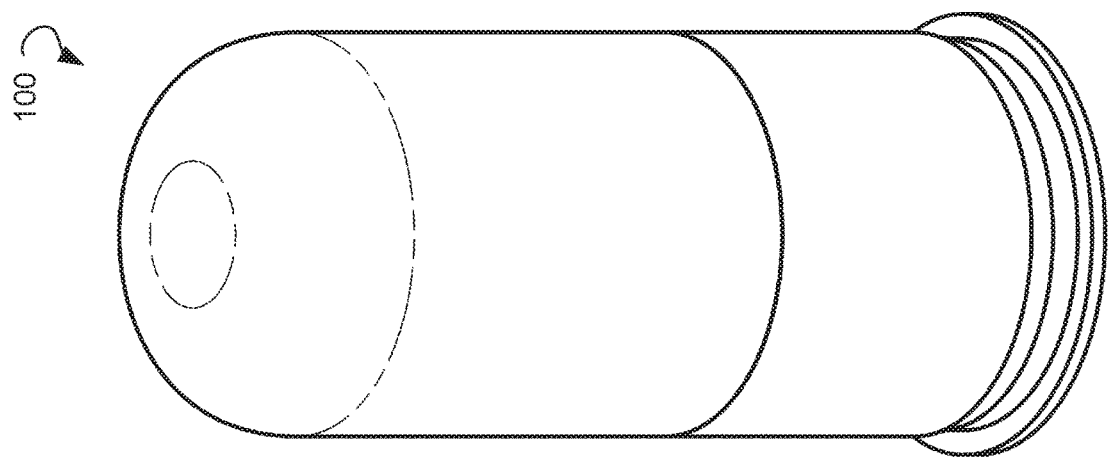

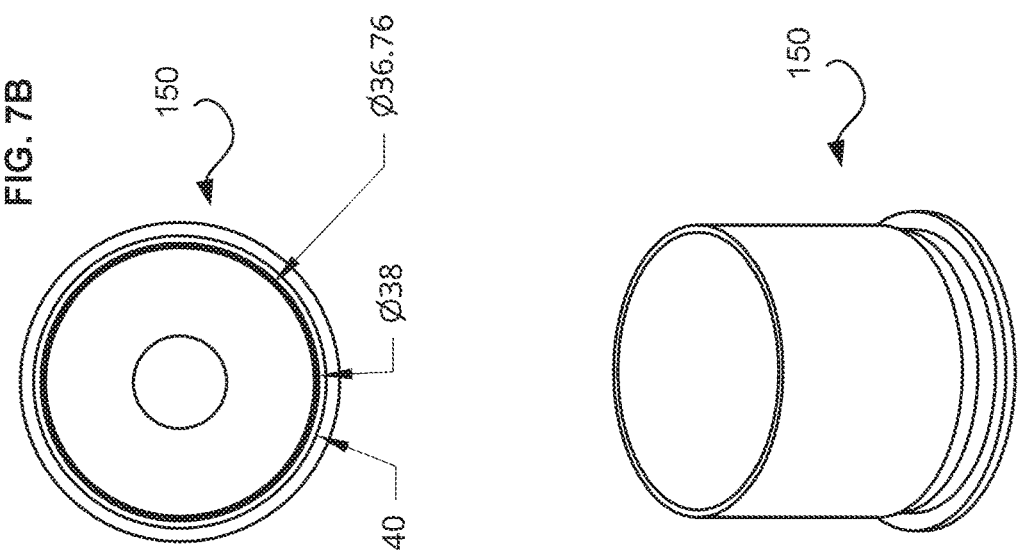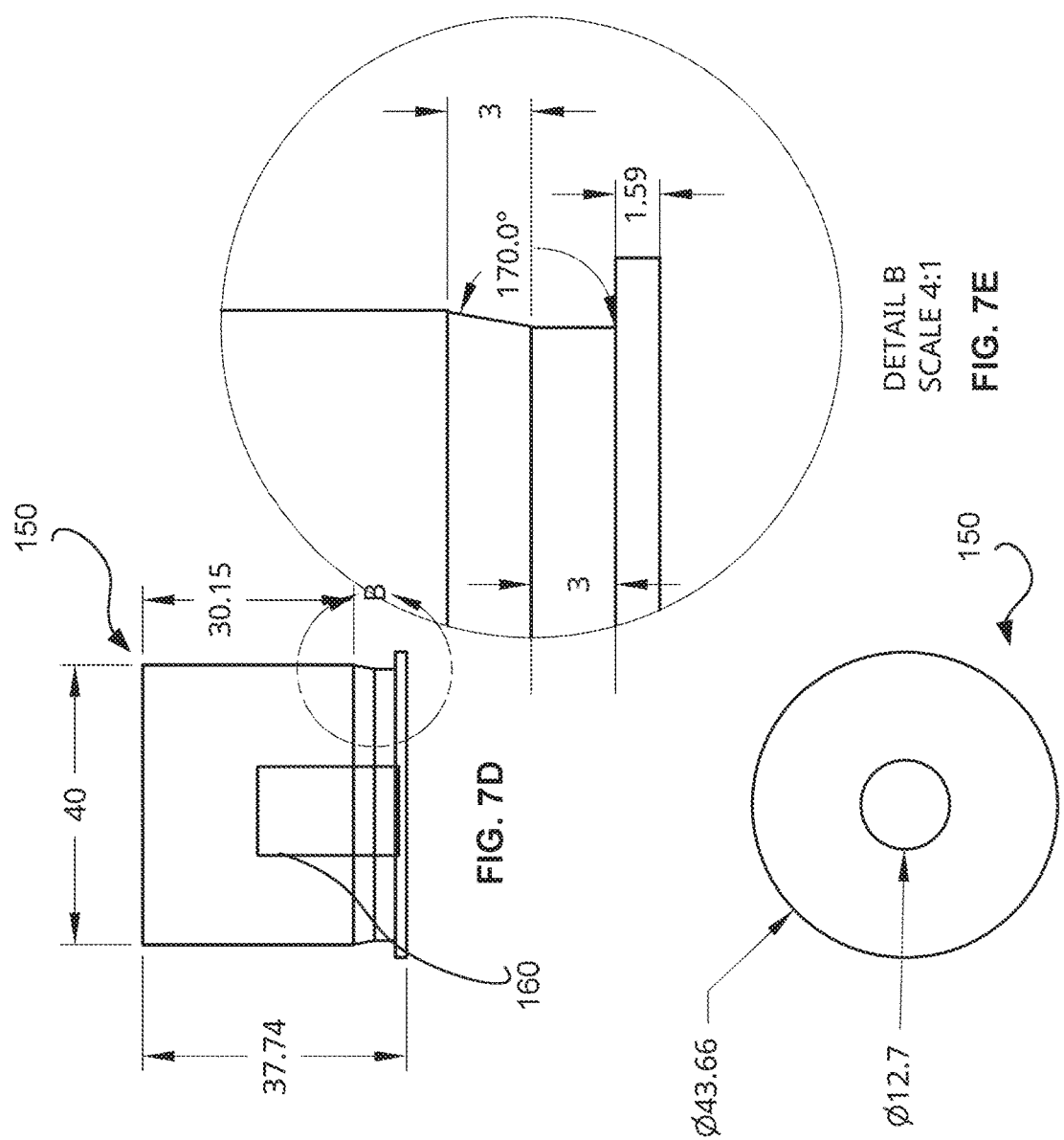

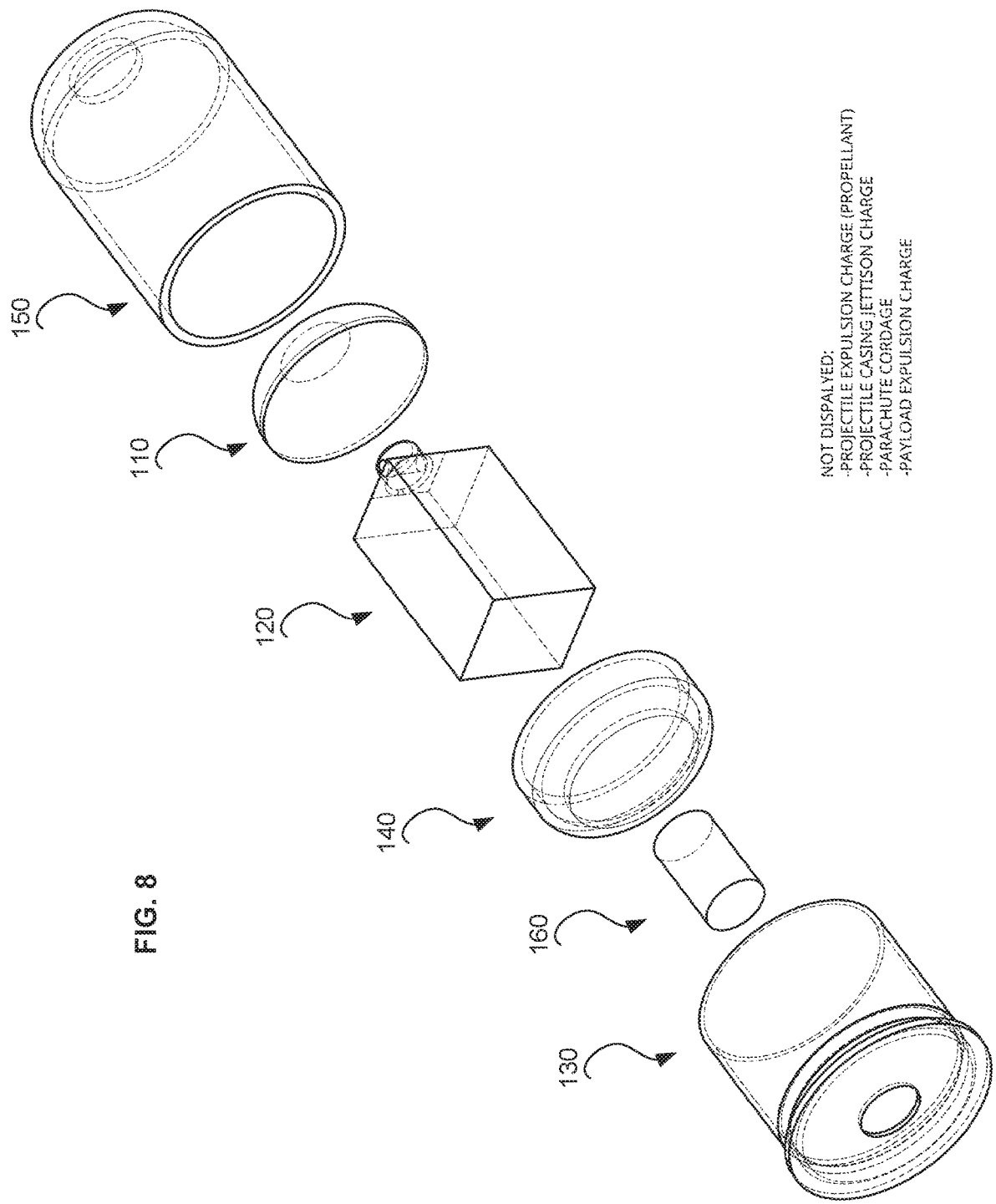

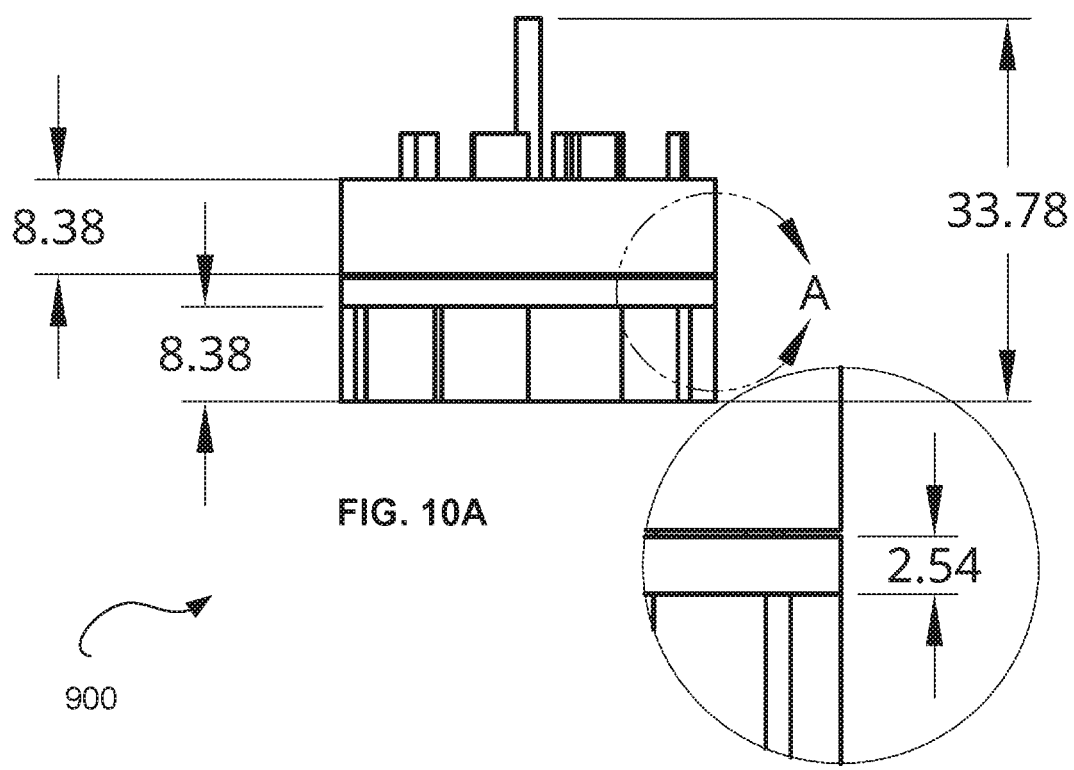
FIG. 10A
DETAIL A
SCALE 2:1
FIG. 10B
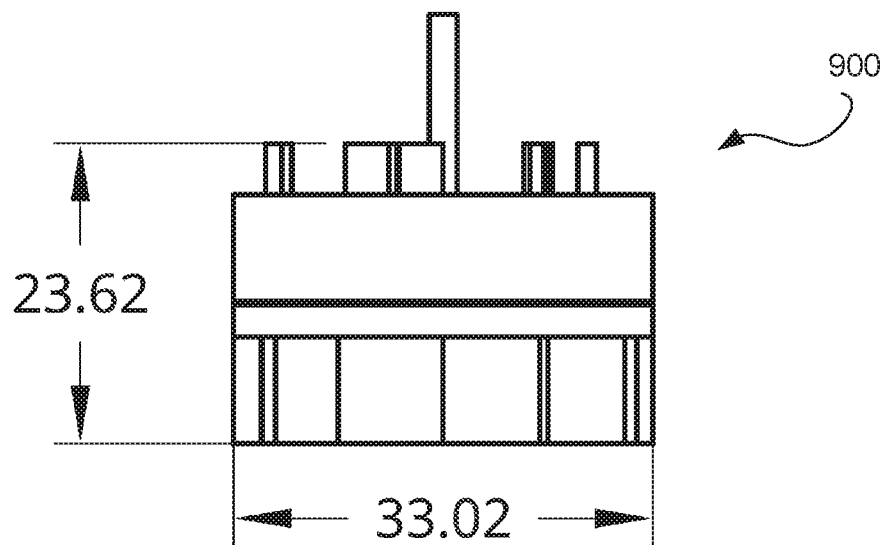
FIG. 10C

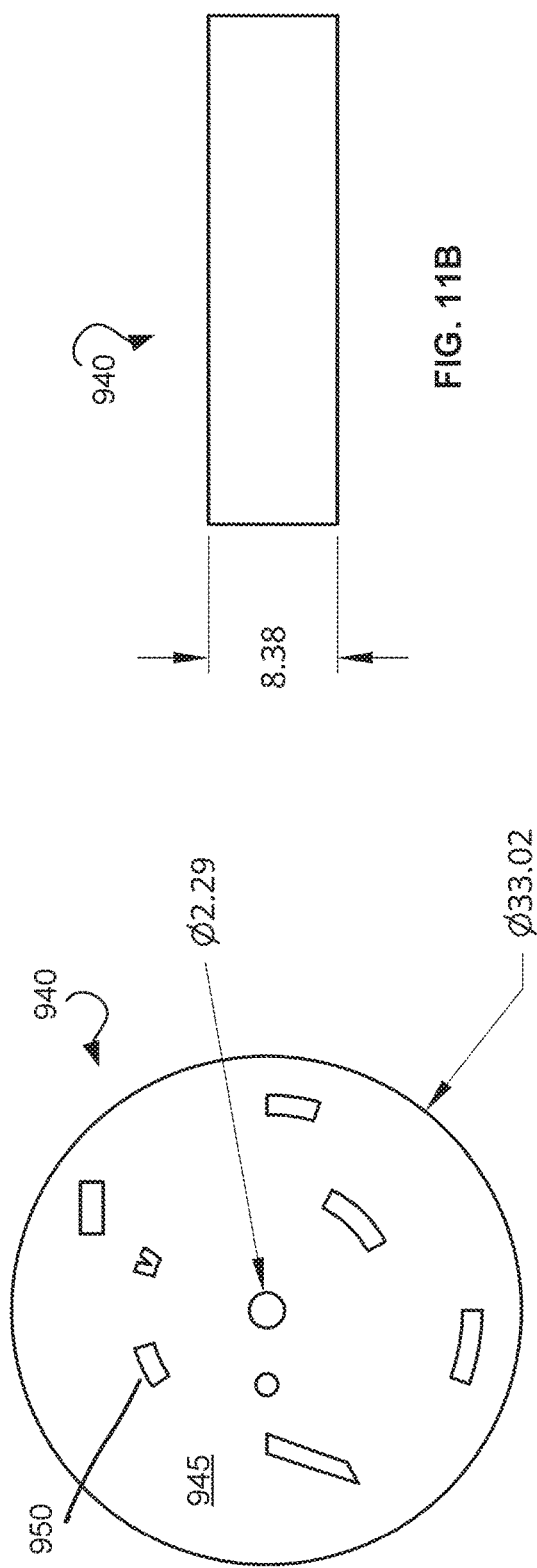

DISPLACEABLE SIGNAL RELAY NODE PACKAGE

CROSS-REFERENCE TO RELATED APPLICATION

The present application claims the priority benefit of U.S. Non-Provisional application Ser. No. 15/975,395 filed on May 9, 2018, which claims priority to U.S. Provisional Application No. 62/603,659 filed on Jun. 8, 2017. The above-referenced applications are hereby incorporated by reference in its entirety for all purposes, including any references cited therein.

FIELD

The present technology pertains to a signal relay node that can be coupled to a projectile, to overcome physical obstructions to signal propagation by the signal relay node.

BACKGROUND

The bedrock of tactical effectiveness is to achieve "shoot, move, and communicate" superiority. When freedom of movement is restricted, the ability to effectively communicate can mean the difference between a service member returning to their loved ones or expiring on the battlefield.

At times when communication is critical, there can be barriers to effective communication, such as physical obstructions in the surrounding environment. In those instances, typically higher ground is needed to overcome the challenge that physical obstructions present to effective signal propagation.

Embodiments of the present technology provide mechanisms for overcoming physical obstructions to effective signal propagation, without a human needing to expose themselves from a position of tactical advantage (i.e. cover, concealment, etc.).

SUMMARY

Various embodiments of the present disclosure are directed to the physical displacement of a signal relay node via a delivery system, so that obstructions to signal propagation can be overcome and signal degradation mitigated. In some embodiments, the delivery system is a launching system for a projectile. By coupling a projectile-based delivery system with a displaceable signal relay node, the signal relay node can be physically moved to a different location, allowing for enhanced signal propagation by the signal relay node. In this way, the party in need of communicating can do so with minimal risk of advanced signature, thereby minimizing the threat of compromise and maintaining the element of surprise.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 1A is an exemplary exterior view of a signal relay node cartridge.

FIG. 1B is an exemplary interior profile file of components within a signal relay node cartridge.

FIG. 7A depicts an exemplary exterior view of cartridge casing.

FIG. 7B depicts an exemplary top view of cartridge casing.

FIG. 7C depicts an exemplary bottom view of cartridge casing.

FIG. 7D depicts an exemplary side profile view of cartridge casing.

FIG. 7E depicts an exemplary close-up view of a bottom portion of cartridge casing.

FIG. 8 depicts a simplified view of components of the cartridge forming an assembled cartridge.

FIG. 10A depicts the safe and arming system with exemplary dimensions.

FIG. 10B depicts a close-up view of an exemplary base plate of the safe and arming system.

FIG. 10C depicts a side profile view of the safe and arming system.

FIG. 11A depicts an exemplary cover plate of the safe and arming system.

FIG. 11B depicts an exemplary side profile view of cover plate of the safe and arming system.

FIG. 11C depicts an exemplary bottom view of cover plate of the safe and arming system.

DETAILED DESCRIPTION

Figure 2C:
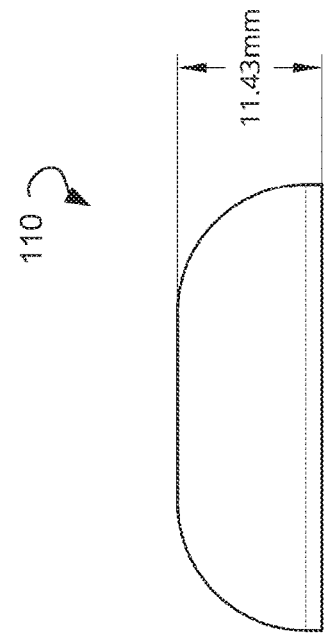
FIG. 2C depicts an exemplary side profile view of the aloft package.

The present disclosure is now described more fully with reference to the accompanying drawings, in which example embodiments of the present disclosure are shown. The present disclosure may, however, be embodied in many different forms and should not be construed as necessarily being limited to the example embodiments set forth herein. Rather, these example embodiments are provided so that the disclosure is thorough and complete, and fully conveys the concepts of the present disclosure to those skilled in the art. Also, features described with respect to certain example embodiments may be combined in and/or with various other example embodiments. Different aspects and/or elements of example embodiments, as disclosed herein, may be combined in a similar manner. Further, at least some example embodiments may individually and/or collectively be components of a larger system, wherein other procedures may take precedence over and/or otherwise modify their application. Additionally, a number of steps may be required before, after, and/or concurrently with example embodiments, as disclosed herein.

Embodiments of the present invention provide a signal relay node that can be displaced to provide signal transmission outside of an area with physical obstructions. In exemplary embodiments, the displaceable signal relay node can be encased within a cartridge, and displaced via a launching system. An exemplary launching system is a grenade launcher, which can launch a displaceable signal relay node within a cartridge that has the form factor of a 40 mm grenade. To effectuate the launch via a grenade launcher, there may also be a propellant base that enables the physical displacement of the cartridge when fired from a standard 40 mm grenade launcher. The signal relay node is enclosed inside a cartridge that is an aerodynamic projectile body atop a propellant base, as described in further detail herein. Additionally, the signal relay node can be a part of collaborative devices where the transmitter side of one device is effectively able to project its signal into the receiver side of the other device, and vice versa.

A principal advantage of utilizing the technology described herein is the interoperability and ease of use for potential end users (military personnel, law enforcement officers, hikers, boaters, etc.). The displaceable signal relay node is designed to be compatible with existing tools already used by potential end users. The displaceable signal relay node is designed to simply replicate the signal introduced and retransmit that signal so, while additional encryption should not be needed, encryption/frequency-hopping methods could be incorporated into different embodiments for additional communications security. The displaceable signal relay node drastically improves the ability to communicate—thereby offering drastically improved survivability for potential end users.

FIG. 1A depicts an exemplary exterior view of a signal relay node cartridge 100, also referred to herein as simply cartridge 100. FIG. 1B depicts an exemplary interior profile file of components within a signal relay node cartridge 100. In the exemplary figures, there is an aloft package 110, a signal relay node 120, a projectile cap 130, a projectile base 140, a (removable) cartridge casing 150, and an initiator 160. Each of these components will be discussed in further detail below. The components are all packed together to form a cartridge 100. Displaceable signal relay node is also referred to herein as "DSRN". Further, a DSRN package as used herein refers to aloft package 110 in combination with signal relay node 120. A "payload" as used herein may refer to aloft package 110, signal relay node 120, and projectile cap 130.

Cartridge 100 is released from a delivery system, also sometimes referred to herein as launching unit. Exemplary launching units are a grenade launcher, gun, or other type of tube-launching mechanism for cartridges. Launching unit may incorporate propellant and/or propulsion means to launch cartridge 100 in the intended direction. For example, a DSRN of myriad form factors can be deployed from devices similar, but not limited to a rescue flare gun, mortar tube, rocket launcher (e.g. bazooka-style launcher), artillery piece, or otherwise.

In additional embodiments, a DSRN package may be incorporated within an artillery projectile, with cellulose packaging, instead of or in addition to being placed within cartridge 100. Modifying the embodiment to varying calibers allows for variation in physical displacement from launcher, time aloft, and communications signal transmission/relay power as required by the end user (i.e. larger caliber projectiles would allow for larger batteries which would facilitate greater signal transmission strength and/or longer time the signal relay node could remain aloft).

Propulsion methods may include, but are not limited to, low-explosive solid propellants such as gunpowder or nitrocellulose-based powders. Pressurized fluids (liquid or gas) or tension release tools (spring, bowstring, etc.) could be utilized instead of an explosive propellant. Electromagnetic (EM) rail technology could also be employed. EM rail, rocket, and mortar tube embodiments would allow for the more rapid fielding of nodes that could be displaced greater distances (to overcome obstructions from: skyscrapers while on low ground in metropolitan areas, mountainous terrain while in a valley, etc.), while the flare gun embodiment would enable adventure sports enthusiasts (hikers, boaters, etc.) with an added layer of security.

In other embodiments, a DSRN can be deployed from a laterally displaced site. A DSRN package could be deposited along an infiltration route or at a distinct position that would allow for effective communications relay from the objective area (in areas of potential communication degradation) to the intended recipient.

If a tactical element is venturing into an environment where an obstacle to signal propagation is known and expected, a person can utilize a different method to displace their DSRN package via a tetherable aerostat. The DSRN package can be attached to a large lightweight, compressible container made of a gas impermeable substance like ultrathin foil or rubber. Within the container there are chemical compounds in separate, less durable containers. Once mixed, the chemical compounds would generate a lighter-than-air gas. An operator could simply apply pressure, rotational force, or otherwise mix the compounds within the container, triggering the chemical reaction that fills the container with the lighter-than-air gas. The operator would then ensure electricity is powering the DSRN package before allowing the package to float aloft. To prevent accidental launch of a DSRN package that was not previously powered up, one possible employment method could integrate the mechanism that introduces the chemical catalyst with the mechanism that supplies electricity to the DSRN package—a single non-conductive cable could simultaneously tear a pouch containing the catalyst while enabling electrical contacts to connect with another and form a circuit providing power from a battery to the DSRN package.

In high wind environments, thin durable wires can be attached to the DSRN package and then staked into the ground along an infiltration route or affixed to structures such as trees to ensure the DSRN package does not float too far away from the objective area to be effective.

Upon firing from a launching unit, preferably at an upward angle, cartridge 100 travels upward into the air with assistance from an interior projectile. In exemplary embodiments, cartridge 100 is configured for launch via a 40 mm grenade launcher. Then aloft package 110 and signal relay node 120 (DSRN package) remain in the air for a certain amount of time, to relay/transmit a desired signal. The remaining components of cartridge 100 fall away.

Initiator 160 may comprise a propellant, or some other initiation mechanism for cartridge 100. The propellant can comprise gunpowder, rocket fuel, or other mechanism for engaging with the launching unit to launch the cartridge 100 into the air, as discussed herein.

In various embodiments, DSRN package may optionally also transmit a burst transmission of Positioning, Navigation, and Timing (PNT) data (i.e. Global Positioning System (GPS) satellite or otherwise derived latitude/longitude, MGRS coordinates, etc.) upon firing from the delivery system. The feature to transmit PNT data may be enabled or disabled prior to DSRN deployment, and variable depending on the application, environment, and user preferences. While an injured hiker may want to advertise their position and emergency status to as many potential responders as they possibly can, a military element may want the ability to disable the transmission of the location data related to the point of origin, as interception of that transmission could identify their physical position. In other embodiments, PNT data can be captured as soon as possible after launch, and that locational data can be transmitted to a predetermined end user according to user pre-defined parameters/protocols.

In various embodiments, the DSRN package can be equipped to transmit and/or relay signals from separate, resident, and/or collaborative sensor(s) (i.e. electro-optical surveillance camera, infrared, thermal imaging, etc.) to provide rapid intelligence, surveillance, and reconnaissance coverage of an objective area and supply ground force commanders with enhanced situational awareness while simultaneously transmitting the collected data to predetermined end users (i.e. both the operations center and the ground force commander) according to user-defined parameters/protocols.

In the exemplary FIG. 1B, the total length of the cartridge 100 is noted as 3.74 inches for a 40 mm diameter cartridge. However, as would be understood by persons of ordinary skill in the art, the actual cartridge length can be greater than or less than 3.74 inches in other embodiments. In particular, if a launching unit other than a 40 mm grenade launcher is utilized to launch the cartridge 100, the dimensions will be adjusted accordingly for the specific type of launching unit.

Figure 2A:
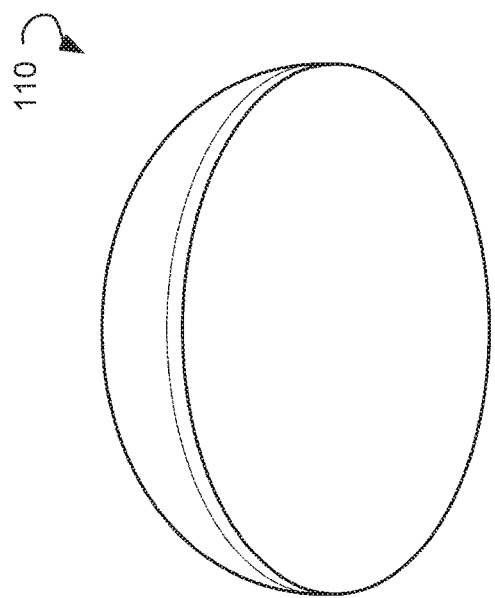
FIG. 2A depicts a close-up view of an exemplary aloft package—in one embodiment, a parachute assembly.
Figure 2B:
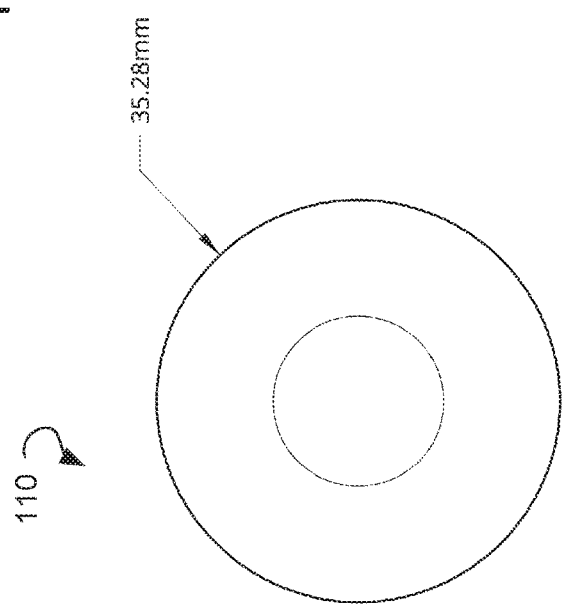
FIG. 2B depicts an exemplary top view of the aloft package.

FIG. 2A depicts a close-up view of an exemplary aloft package 110, FIG. 2B depicts an exemplary top view of the aloft package 110, and FIG. 2C depicts an exemplary side profile view of the aloft package 110. In various embodiments, the aloft package 110 is attached to the signal relay node 120, that carries the signal relay node through the air and keeps it aloft for a period of time.

In some embodiments, aloft package 110 can comprise a parachute (folded material such as silk) that opens upon meeting of a certain trigger condition, such as a set distance or amount of time after launch. Upon deployment of a parachute from aloft package 110, the descent of signal relay node 120 back to Earth will be slowed, thus allowing for signal relay node 120 to attempt to transmit communication signal(s), such as a distress signal.

Alternatively, or additionally, the aloft package 110 can comprise flexible propellers connected to a small motor, such as a motor for an unmanned aerial vehicle. The motor can drive the propellers to keep the attached signal relay node 120 aloft in the air for a certain amount of time after launch.

In one embodiment, the flexible propellers connected to the motor are affixed to the signal relay node 120. Once apex of flight is achieved, the projectile cap 130 would detach from the signal relay node 120, and a ribbon of non-conductive filament (such as plastic filament) secured to the inside of the projectile cap 130 would be pulled from between two electrical contacts. Consequently, a circuit would close that would simultaneously provide electrical power to the propeller motor and signal relay node 120. In another exemplary embodiment, separation of the projectile cap 130 from a signal relay node 120 baseplate/actuator would necessitate the deployment of a flare-type parachute designed to keep the signal relay node 120 aloft. A parachute would allow for the signal relay node 120 to be kept aloft in the air for a shorter amount of time than a motor, but still enough time to allow for burst, emergency-type signal transmission by signal relay node 120.

In other embodiments, other mechanisms for keeping the signal relay node 120 aloft in the air can also be incorporated into the aloft package 110, in addition to, or instead of, a parachute and motor.

The aloft package 110 is further depicted in exemplary FIG. 2B as having a diameter of 35.28 mm, and having a height of 11.43 mm. However, as would be understood by persons of ordinary skill in the art, these dimensions can be lesser or greater in various embodiments than the dimensions depicted in the exemplary figures.

Figure 3:
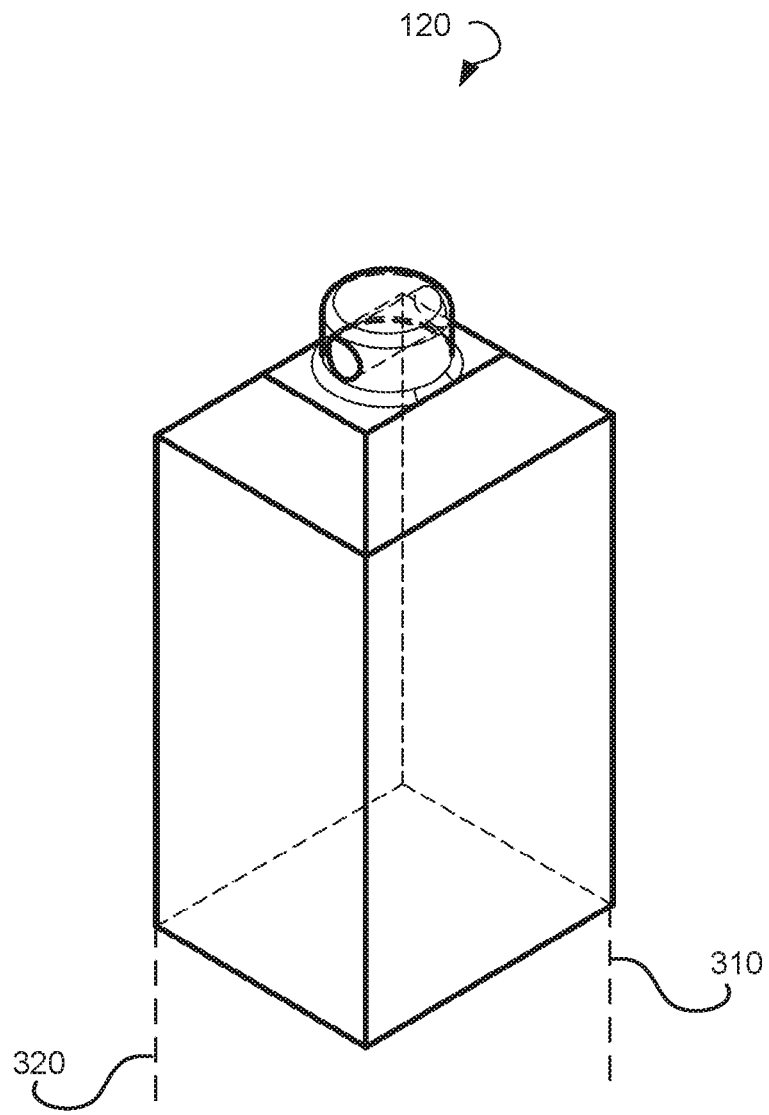
FIG. 3 depicts an exemplary displaceable signal relay node.

FIG. 3 depicts an exemplary signal relay node 120 that is physically displaceable via a delivery system, as discussed herein. In various embodiments, signal relay node 120 can transmit and/or receive communication signal(s) when it is physically displaced by a delivery system. For example, signal relay node 120 can include capabilities of a multi-band radio and be configured to transmit radio signals at one or more set frequencies. Signal relay node 120 can be capable of being tuned to transmit (or receive) signals at various frequencies. There may be an optional transmit antenna 310, and/or receive antenna 320, in various embodiments. While the antennae are depicted as located on the bottom of signal relay node 120 in exemplary FIG. 3, they may be placed at other locations on signal relay node 120 in other embodiments. Alternatively, transmit antenna 310 and/or receive antenna 320 may be internal to signal relay node 120.

In exemplary embodiments, signal relay node 120 can include capabilities of any of wireless communications, such as broadcast radio, RFID (radio frequency identification), microwave wireless communication, Wi-Fi, WiMAX, Bluetooth, ZigBee, infrared (IF), satellite, and cellular phone signals (3G, 4G, 5G, LTE, GSM, etc.). Signal relay node 120 can be utilized to transmit emergency distress signals, or other types of communications. In various embodiments, signal relay node 120 may comprise a plurality of different types of communication systems, and may attempt to transmit signals with each communication system in sequence, to increase the chances of completing a signal transmission. In further embodiments, signal relay node 120 may also be configured to receive wireless communications from any wireless communication capability.

Signal relay node 120 may be powered by an onboard battery that is powered after launch from a delivery system, such as a grenade launcher. Signal transmission may be continually attempted by signal relay node 120 as long as power is flowing to the signal relay node 120. In various embodiments, other power-producing mechanisms may be used to power signal relay node 120 in addition to, or instead of, a battery, such as a solar panel or wind turbine. In other embodiments, a power source (such as a battery) from aloft package 110 may also provide power to signal relay node 120.

In various embodiments, as the projectile cap 130 separates from the DSRN package, the physical displacement removes a non-conducting filament (such as plastic filament) affixed to the interior of the projectile cap 130 from electrical contacts at the base of the DSRN package projectile base 140. When the projectile cap 130 separates from the DSRN package, it pulls out a plastic separator that was previously stopping the flow of electric current from a main battery into the DSRN package. Separation of the projectile cap 130 displaces the filament, which closes an electrical circuit and provides the main battery's electrical power to the DSRN package. Closure of the circuit may turn on the signal relay node 120 and simultaneously provide power to a motor within aloft package 110, to keep the DSRN package aloft and powered to transmit signals.

Figure 4B:
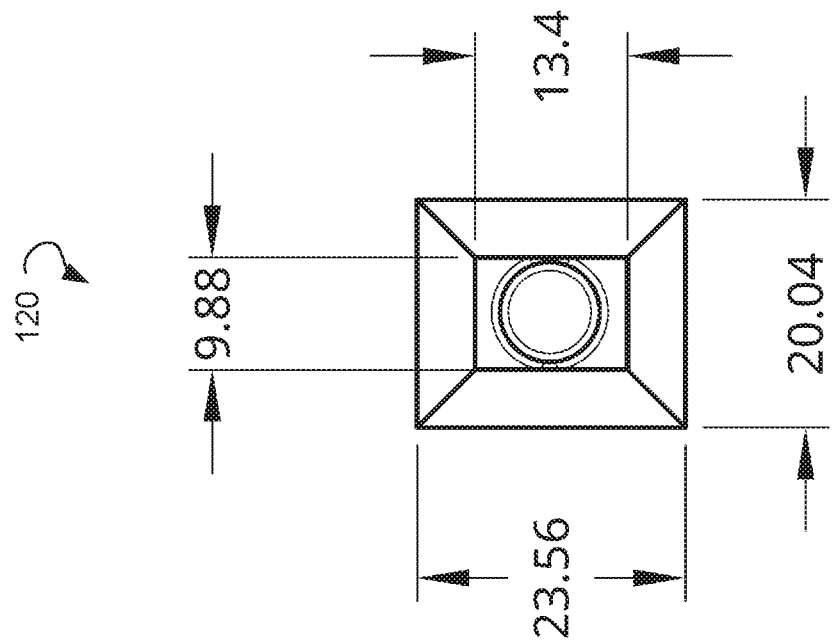
FIG. 4B depicts an exemplary top view of a signal relay node.
Figure 4A:
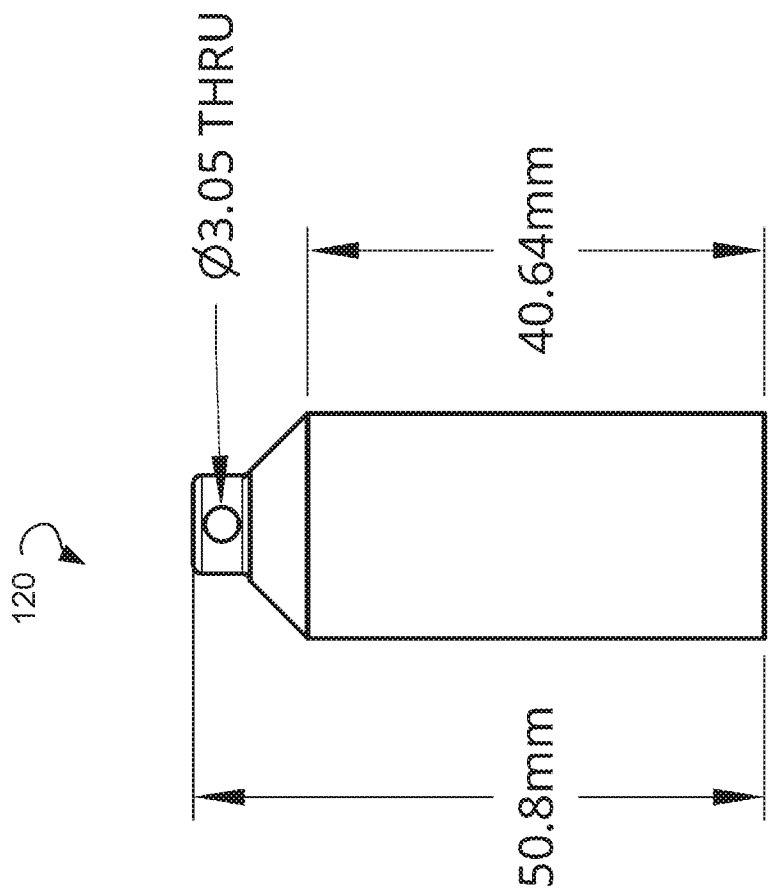
FIG. 4A depicts an exemplary side profile view of a signal relay node.

FIG. 4A depicts an exemplary side profile view of a signal relay node 120, with exemplary dimensions. FIG. 4B depicts an exemplary top view of a signal relay node 120, with exemplary dimensions. As would be understood by persons of ordinary skill in the art, actual dimensions may be greater than or less than the ones depicted in these exemplary figures.

The exemplary signal relay node 120 is depicted in FIG. 4A as being 50.8 mm in height. The exemplary signal relay node 120 is also depicted as having a cylindrical shaped hole of 3.05 mm in diameter. The cylindrical shaped hole may be used in various embodiments to attach signal relay node 120 to aloft package 110. For example, a cord from a parachute may be threaded through the cylindrical shaped hole. In some embodiments, as the projectile cap 130 separates from the signal relay node 120, a cord may be pulled, which can activate opening of a parachute in aloft package 110. The cylindrical shaped hole may be omitted in other embodiments, if other mechanisms are utilized to attach aloft package 110 with signal relay node 120.

Figure 4D:
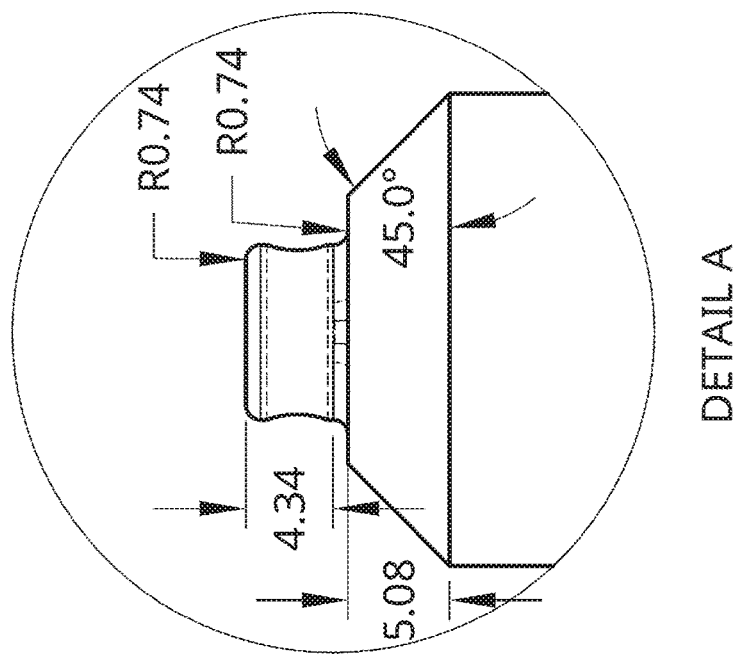
FIG. 4D depicts an exemplary close-up of the top portion of signal relay node.
Figure 4C:
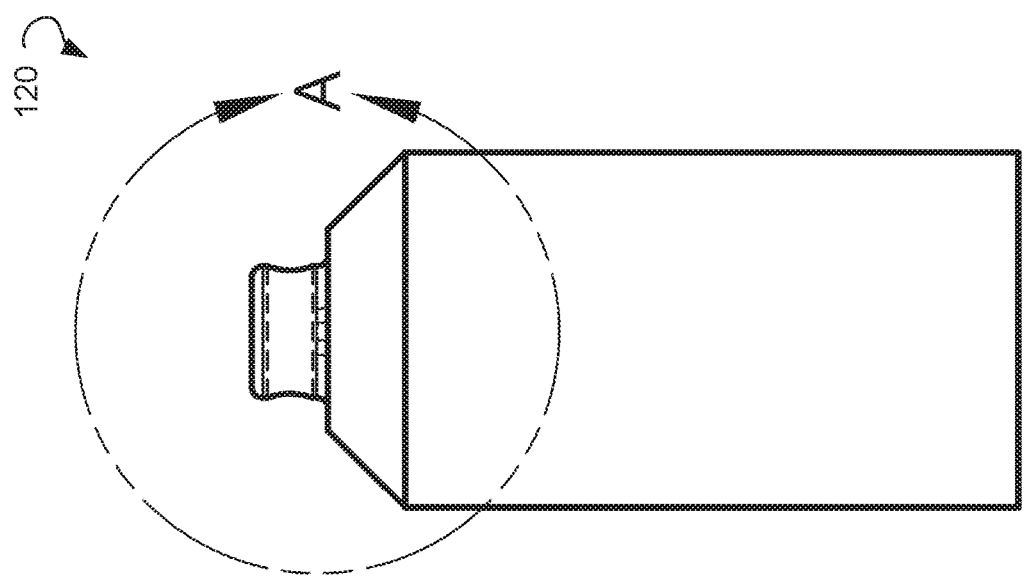
FIG. 4C depicts another exemplary side profile view of a signal relay node.

FIG. 4C depicts another exemplary side profile view of a signal relay node 120, and FIG. 4D depicts an exemplary close-up of the top portion of signal relay node 120 with exemplary dimensions. Again, as would be understood by persons of ordinary skill in the art, dimensions may vary from those shown in the exemplary figures and still be within the scope of this disclosure.

Figure 5B:
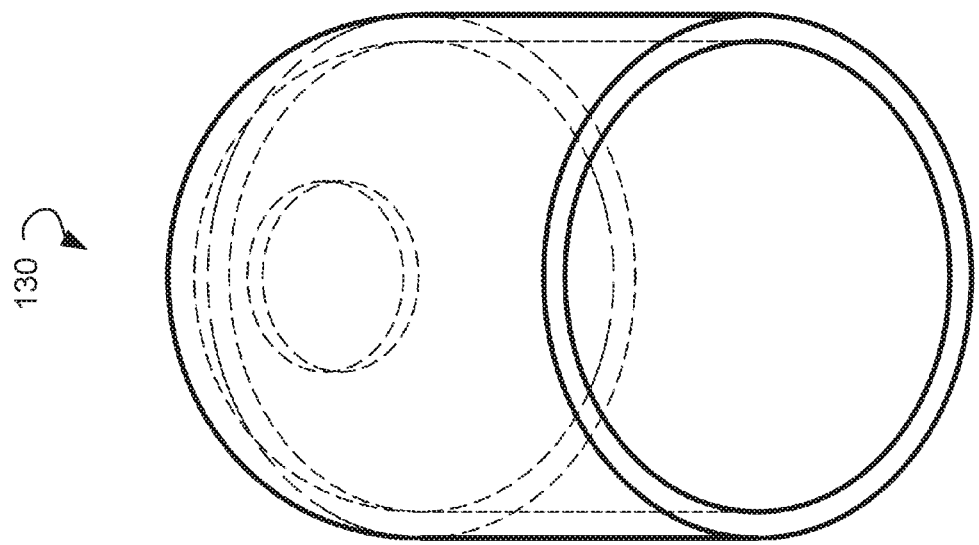
FIG. 5B depicts an exemplary interior view of a projectile cap.
Figure 5A:
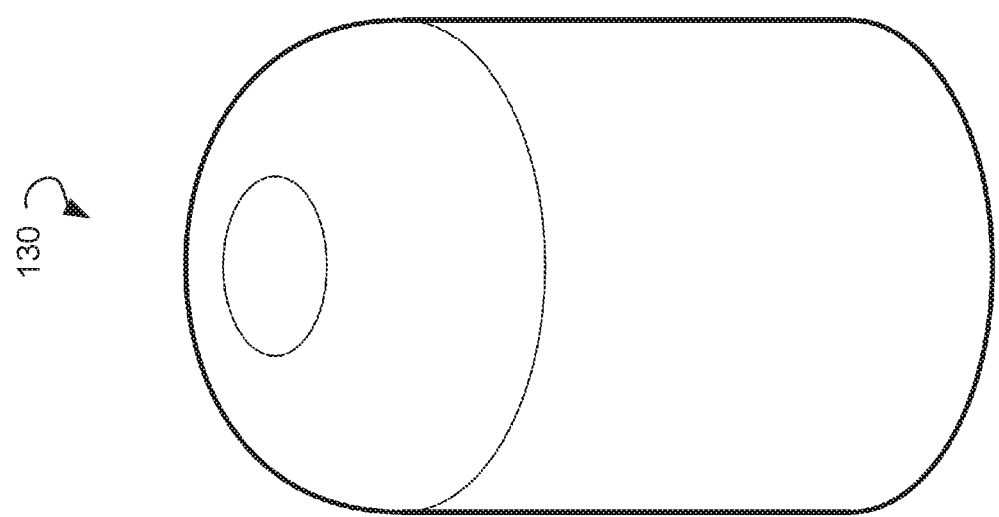
FIG. 5A depicts an exemplary exterior view of a projectile cap.
Figure 5C:
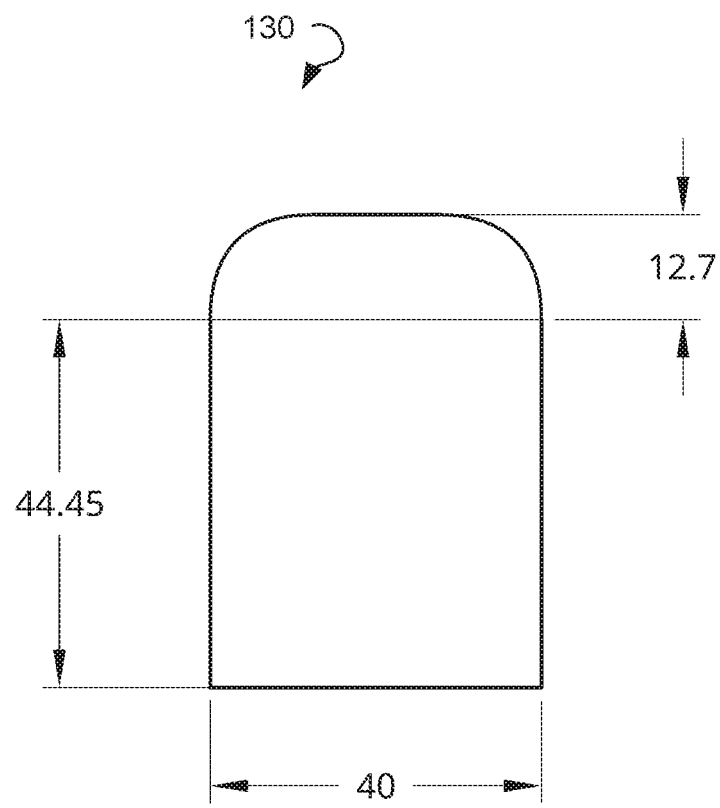
FIG. 5C depicts another exemplary exterior view of a projectile cap.
Figure 5D:
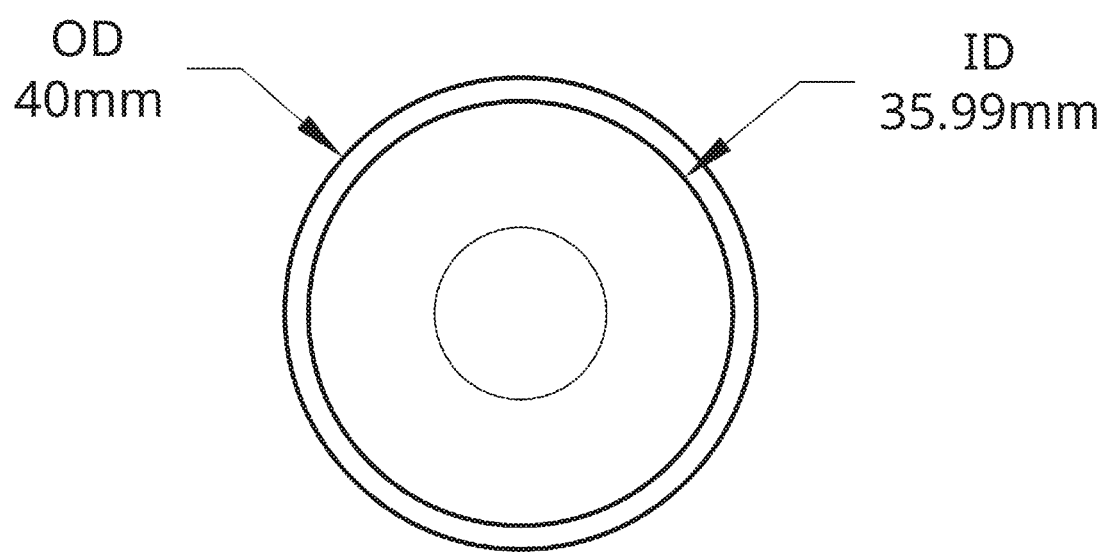
FIG. 5D depicts an exemplary bottom view of a projectile cap.

FIG. 5A depicts an exemplary exterior view of a projectile cap 130. FIG. 5B depicts an exemplary interior view of a projectile cap 130. FIG. 5C depicts another exemplary exterior view of a projectile cap 130, with exemplary dimensions. FIG. 5D depicts an exemplary bottom view of a projectile cap 130, with exemplary dimensions. As would be understood by persons of ordinary skill in the art, projectile cap 130 may have larger or small dimensions than those noted in these exemplary figures, in other embodiments. Projectile cap 130 may also incorporate embellishments (holes, bumps, etc.) to allow for tactile identification of the DSRN as well as enhancing performance and stabilization (rifling, air holes to assist separation of projectile cap 130, etc.).

Projectile cap 130 sits atop projectile base 140 and provides a barrier between the projectile within cartridge 100 and the signal relay node 120. In this way, when a projectile is activated for cartridge 100, signal relay node 120 within cartridge 100 is protected from excessive heat, pressure forces, or debris generated by activation of the projectile.

Figure 6D:
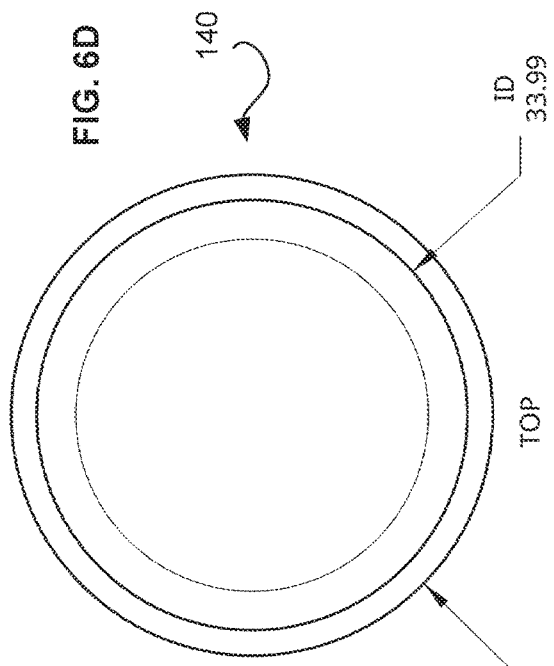
FIG. 6D depicts an exemplary top view of projectile base.
Figure 6A:
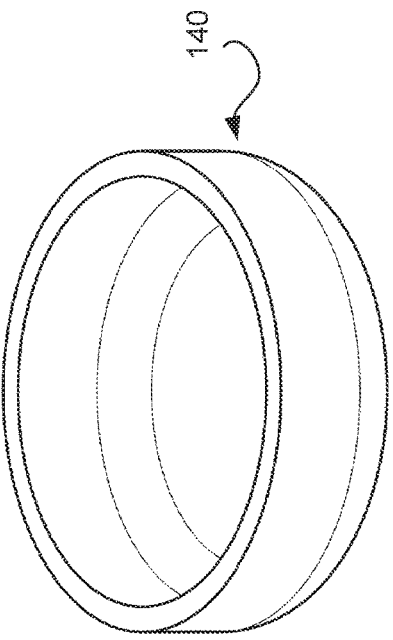
FIG. 6A depicts an exemplary view of a projectile base.
Figure 6B:
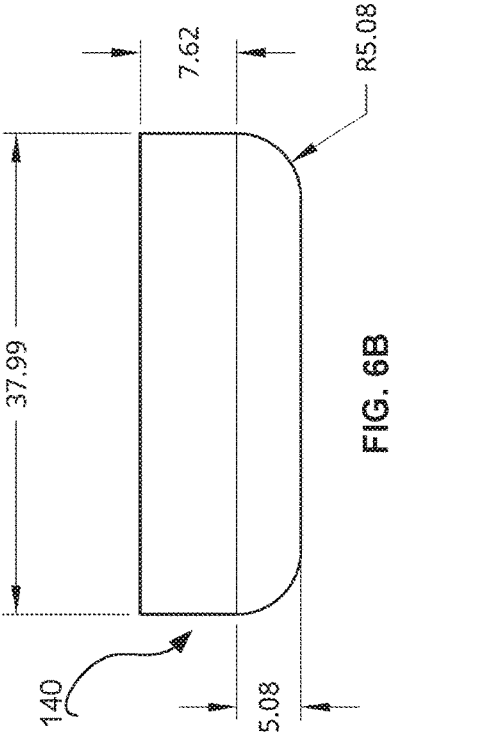
FIG. 6B depicts an exemplary side profile view of a projectile base.
Figure 6C:
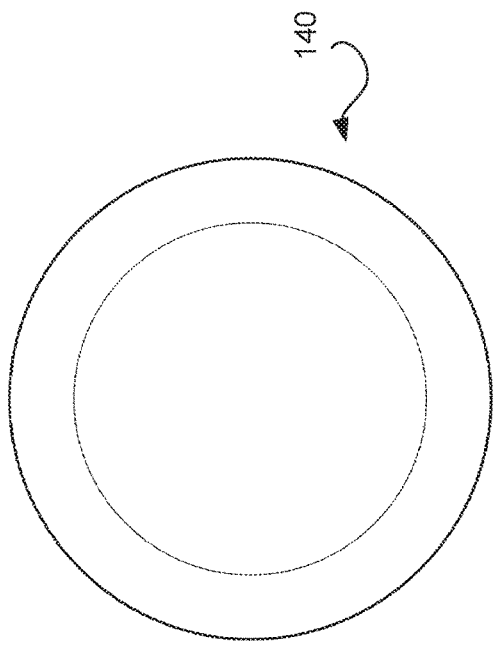
FIG. 6C depicts an exemplary bottom view of projectile base.

FIG. 6A depicts an exemplary view of a projectile base 140. FIG. 6B depicts an exemplary side profile view of a projectile base 140, including exemplary dimensions. FIG. 6C depicts an exemplary bottom view of projectile base 140. FIG. 6D depicts an exemplary top view of projectile base 140, with exemplary dimensions. As would be understood by persons of ordinary skill in the art, projectile base 140 may have larger or small dimensions than those noted on the exemplary figures, in other embodiments.

Cartridge casing 150 may contain any type of propellant, for launching signal relay node 120 from a delivery system. In various embodiments, the propellant may be any one or more of gunpowder, rocket propellant, a high-pressure projecting mechanism, an electromagnetic projecting mechanism, or any other mechanism for launching a displaceable signal relay node 120 via a delivery system.

FIG. 7A depicts an exemplary exterior view of cartridge casing 150. FIG. 7B depicts an exemplary top view of cartridge casing 150, including exemplary dimensions. FIG. 7C depicts an exemplary bottom view of cartridge casing 150, including exemplary dimensions. FIG. 7D depicts an exemplary side profile view of cartridge casing 150 and initiator 160, including exemplary dimensions. FIG. 7E depicts an exemplary close-up view of a bottom portion of cartridge casing 150 from FIG. 7D, including exemplary dimensions. As would be understood by persons of ordinary skill in the art, cartridge casing 150 may have larger or small dimensions than those noted on the exemplary figures, in other embodiments.

Cartridge casing 150 is constructed of any material suitable to withstand the high heat and forces generated by the delivery system that is used to deploy cartridge 100. Cartridge casing 150 provides a substantially cylindrical shaped enclosure for components of cartridge 100, including initiator 160. Upon firing of cartridge 100 by a delivery system (such as a grenade launcher), initiator 160 initiates propellant ignition and the resulting set-back forces cause cartridge casing 150 to be physically separated. In this way, signal relay node 120, aloft package 110, projectile cap 130, and projectile base 140 can continue an upward trajectory into the air, unencumbered by any excess weight from components no longer necessary. Thus, cartridge casing 150 is an exemplary, optional, and removable component of DSRN cartridge 100, physically separating from payload components of cartridge upon launch of the cartridge (also sometimes referred to herein as "initiation" or "firing" of the cartridge). In other embodiments, cartridge casing 150 can be replaced with a separate propellant (i.e., gun powder, mortar propellant ring charges, rocket motors, high-pressure fluid, electromagnetic rails, etc.).

FIG. 8 depicts a simplified view of how the components of the cartridge 100 discussed herein fit together to form an assembled cartridge 100. The aloft package 110, signal relay node 120 and projectile base 140 are assembled together and encased within the projectile cap 130 and cartridge casing 150, to form an exemplary cartridge 100. The exemplary figure does not show any projectile expulsion charge (propellant), projectile casing jettison charge, parachute cordage, or payload expulsion charge, though one or more of these components may also be included in cartridge 100.

Figures 9A, 9B:
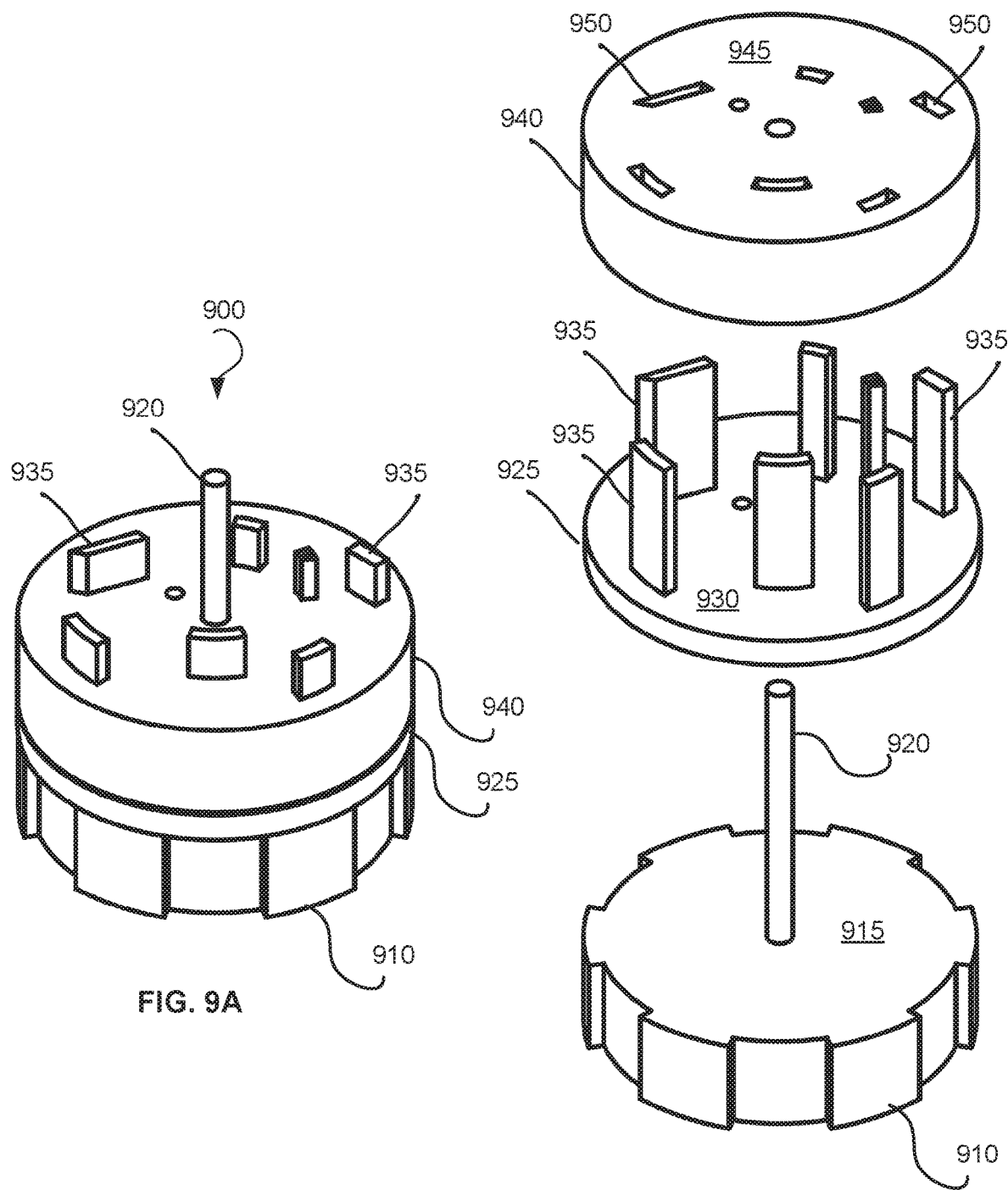
FIG. 9A and FIG. 9B depict an exemplary spring and actuator-enabled safe and arming system that may be present within a cartridge.

FIG. 9A and FIG. 9B depict an exemplary actuator-enabled safe and arming system 900 that may be present within a cartridge 100, such as within projectile base 140, in various embodiments. The safe and arming system 900 may provide power to the signal relay node 120 and/or aloft package 110 while aloft in the air. In various embodiments, the safe and arming system 900 may operate in conjunction with one or more batteries (or other power source) to provide electrical power to signal relay node 120 and/or aloft package 110.

FIG. 9B depicts individual components of the safe and arming system 900, while FIG. 9A depicts the components when they are joined together. The safe and arming system 900 initiates the delivery of electrical power once the cartridge 100 is fired, and releases the projectile cap 130 encasing the displaceable signal relay node 120 after it achieves an optimal height. In some embodiments, the optimal height may be a predetermined altitude. In other embodiments, the optimal height can be dynamically determined based on one or more environmental conditions (e.g., physical obstructions in environment, temperature of air, humidity of air, velocity of cartridge 100, global positioning coordinates, etc.). The environmental condition(s) can be measured by one or more sensors placed on aloft package 110 and/or signal relay node 120.

In the exemplary safe and arming system depicted in FIG. 9A and FIG. 9B, there is a rotating hub 910, having a rotating hub top surface 915 and a rotating hub center pole 920. The rotating hub 910 can join with a base plate 925 and a cover plate 940.

The base plate 925 has a base plate top surface 930, and a plurality of tabs 935 that stand upright from the base plate top surface 930. In various embodiments, the tabs 935 are constructed from metal, and/or other similarly electrically conductive material. While the exemplary embodiment in the figures depicts seven tabs of varying shapes, sizes, and configurations, a person of ordinary skill in the art would understand that the tabs 935 can actually be of differing number, shape, size, and/or configuration and still be within the scope of the present disclosure.

The base plate 925 can further join with a cover plate 940 consisting of a cover plate top surface 945 and a plurality of holes 950. The holes 950 are constructed to be of a size, shape, and configuration, such that tabs 935 can fit through them when the base plate 925 and cover plate 940 are joined. There is also a hole 950 on the cover plate 940 through which the center pole 920 can fit.

In various embodiments, projectile base 140 can comprise a spring system. A spring offering rotational tension may be included on base plate 925, or on the underside of cover plate 940. The spring may keep the tabs 935 of base plate 930 from mating with holes 950 of cover plate 940. Upon firing from a launch apparatus/delivery system (such as a grenade launcher), setback forces allow rotating hub 910 to rotate in either a clockwise direction or a counter-clockwise direction. The rotational forces generated by rotating hub 910 overcome the spring system and allow for the tabs 935 to align into holes 950 of cover plate 940.

In some embodiments, the spring system releases the tabs 935 when an apex of flight is achieved by cartridge 100, and the cartridge begins an opposing (downward) trajectory. This may be affected when air flows through downward opening vent holes that provide upward resistance after signal relay node 120 begins its freefall back down to Earth, due to gravity, after weightlessness is achieved at the apex of flight.

In various embodiments, holes 950 of cover plate 940 may have electrical contacts in an open circuit configuration. Tabs 935 are also constructed of an electrically conductive material, such that when tabs 935 align and mate with holes 950, the electrical circuit contained therein is completed and electrical power is generated with the assistance of a power source, such as a battery. The electrical power generated by the safe and arming system 900 may provide electrical power to operate signal relay node 120 and/or aloft package 110 while aloft in the air.

In addition, a separate spring may also be present that offers upward vertical tension on the displaceable signal relay node ("DSRN") package, where the DSRN package comprises the signal relay node 120 and aloft package 110. When sufficient pressure is exerted on the DSRN, the vertical spring would be compressed by the inertia of the fired DSRN package, freeing the rotational spring to rotate the DSRN until the uniquely oriented (metal) tabs 935 on base plate 925 align with, and occupy the holes 950 on the underside of cover plate 940, similar to a key fitting into a lock.

When the force of inertia is lessened as the DSRN package nears the apex of its flight (ballistic apogee), the upward spring tension would drive the metal tabs 935 upward, in-between electrical contacts, closing the circuit and allowing an electrical source to begin providing power to an actuator system whose sole purpose is to rotate a different floating plate nearest the DSRN signal relay node 120, so that cutouts in the floating plate correspond to center facing tabs affixed to the interior of projectile cap 130 that had previously held the cover securely in place.

In various embodiments, the safe and arming system 900 can provide power to an actuator motor that enables separation of the DSRN package from any encasing, such as projectile cap 130. In these embodiments, base plate 925 is under rotational spring tension and is held against cover plate 940 in an offset position such that tabs 935 do not align with holes 950. Cover plate 940 occupies the space at the underside of an actuator system (not shown in the figures).

The actuator system contains an electrical power source distinct from the rest of the DSRN package, a small actuator motor and a third disc-shaped plate (not shown in the figures). Once fired from a launching unit, base plate 925 compresses the vertical spring and the rotational spring allows base plate 925 to rotate such that its upturned tabs 935 are aligned with holes 950 on cover plate 940. The holes 950 have electrical leads, which form an open circuit in the unfired configuration. When the upturned tabs 935 occupy the holes 950, they close an electrical circuit that provides power to the actuator. Once powered, the actuator imparts a rotational force on the third disc, which is the closest disc to the DSRN package body. The third disc also has cutouts (or holes) along its circumference.

Projectile cap 130 enclosing the DSRN package has inwardly turned tabs that, in the unfired configuration, are held in place by the third disc. When rotated by the actuator, however, the third disc's cutouts correspond with the inwardly turned DSRN package case tabs, causing them to align. Diagonally cut holes in the rifled & contoured projectile cap 130 begin to funnel air into the case after the DSRN package begins falling back to Earth. The increased internal airflow causes additional drag that encourages the case to separate from the DSRN package.

Figure 9D:
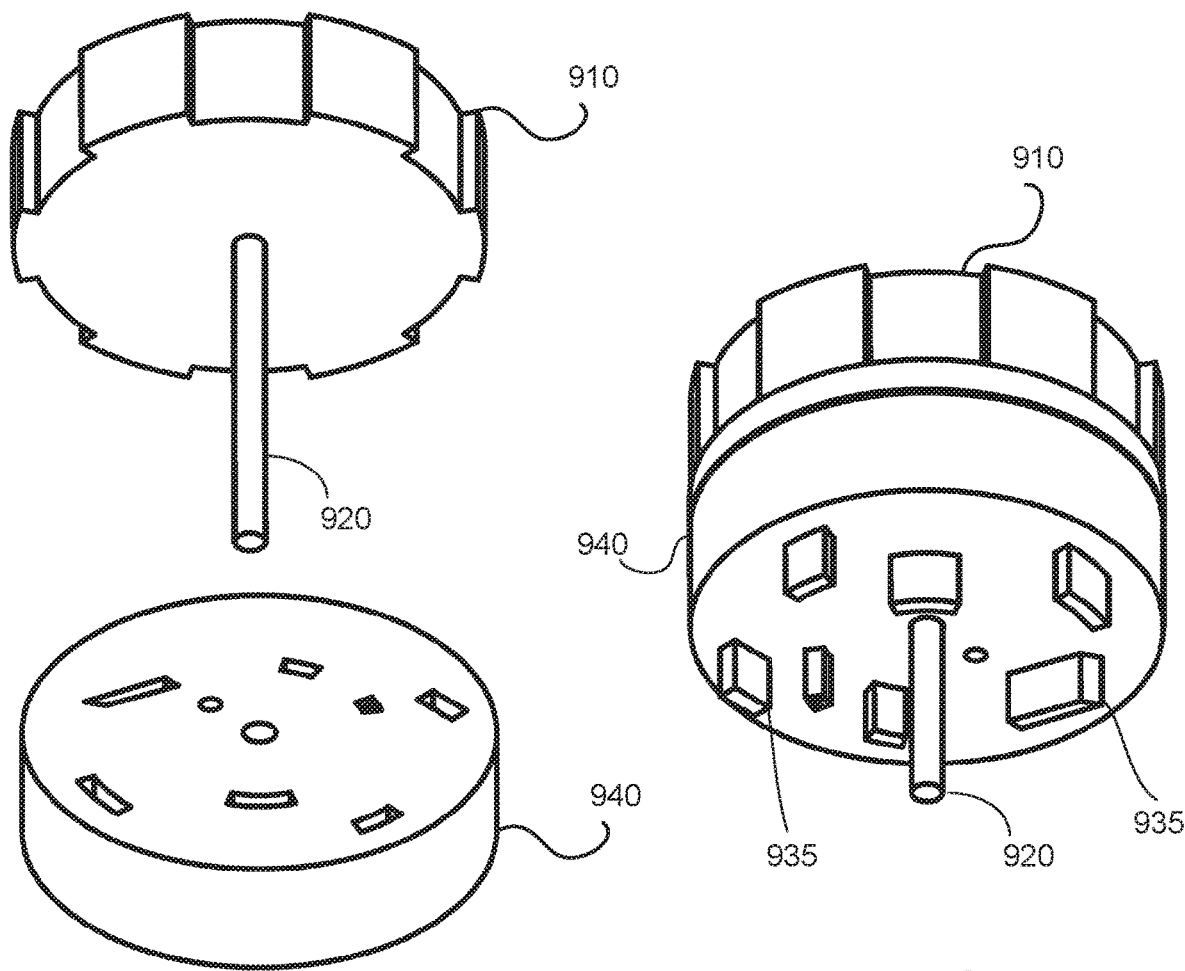
FIG. 9C and FIG. 9D depict another orientation of an exemplary spring and actuator-enabled safe and arming system that may be present within a cartridge.
Figure 9C:
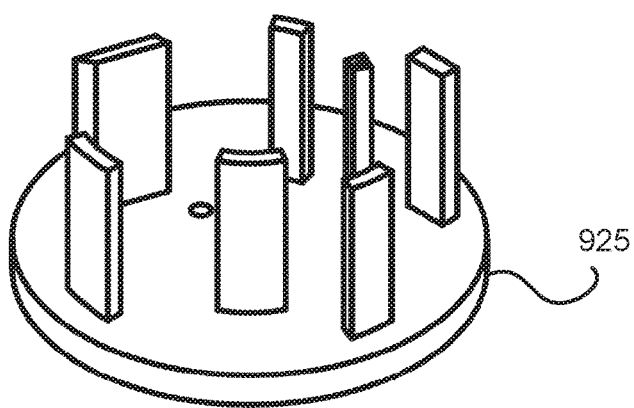
Figure 9E:
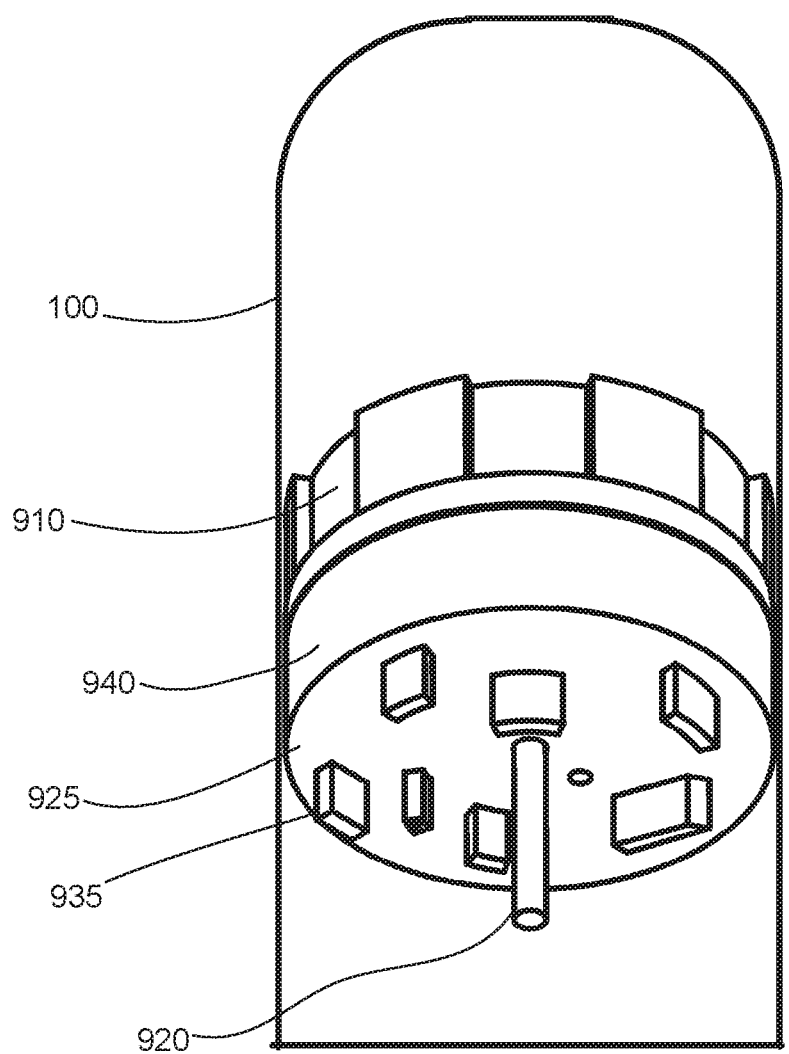
FIG. 9E depicts an exemplary spring and actuator-enabled safe and arming system within a cartridge.

FIG. 9C and FIG. 9D depict another orientation of an exemplary actuator-enabled safe and arming system 900 that may be present within a cartridge 100, such as within projectile base 140, in various embodiments. In this orientation depicted in the exemplary figures, rotating hub 910 has center pole 920 oriented in a downward direction. Center pole 920 goes through cover plate 940 and base plate 925. All other functionality may be the same as discussed above, with reference to FIG. 9A and FIG. 9B. FIG. 9E depicts the exemplary actuator-enabled safe and arming system 900 of FIG. 9C and FIG. 9D within a cartridge 100.

FIG. 10A depicts the safe and arming system 900 with exemplary dimensions. In the exemplary figure, the safe and arming system 900 is 33.78 mm in height. The rotating hub 910 is 8.38 mm in height, excluding the center pole 920. The cover plate 940 is also 8.38 mm in height. FIG. 10B depicts a close-up view of an exemplary base plate 925 as having a height of 2.54 mm. FIG. 10C shows a height from the bottom of the rotating hub 910 to the top of tabs 935 as being 23.62 mm. Additionally, the diameter of rotating hub 910 is shown as 33.02 mm, in the exemplary figure. As would be understood by persons of ordinary skill in the art, actual dimensions in various embodiments may be larger or smaller than those noted in exemplary FIGS. 10A, 10B, and 10C.

FIG. 11A depicts cover plate 940 with exemplary dimensions. Cover plate 940 is depicted as having a diameter of 33.02 mm, with a center hole (for center pole 920) having an exemplary diameter of 2.29 mm. FIG. 11B depicts that an exemplary height of cover plate 940 is 8.38 mm. FIG. 11C depicts an exemplary bottom view of cover plate 940. As depicted in the exemplary bottom view, center hole goes through the entire height of cover plate 940, along with one other hole 950. However, other holes 950 depicted on cover plate top surface 945 do not pierce through to the bottom surface of the cover plate 940. While only these 2 holes are depicted as piercing all the way from the bottom surface of cover plate 940 to cover plate top surface 945, there may be fewer or additional holes 950 that pierce through the entire height of cover plate 940 in other embodiments. Further, the holes 950 may be of different shapes, sizes, and configurations on cover plate 940. Further, as would be understood by persons of ordinary skill in the art, actual dimensions in various embodiments may be larger or smaller than those noted in exemplary FIG. 11A, FIG. 11B, and FIG. 11C.

Figure 12A:
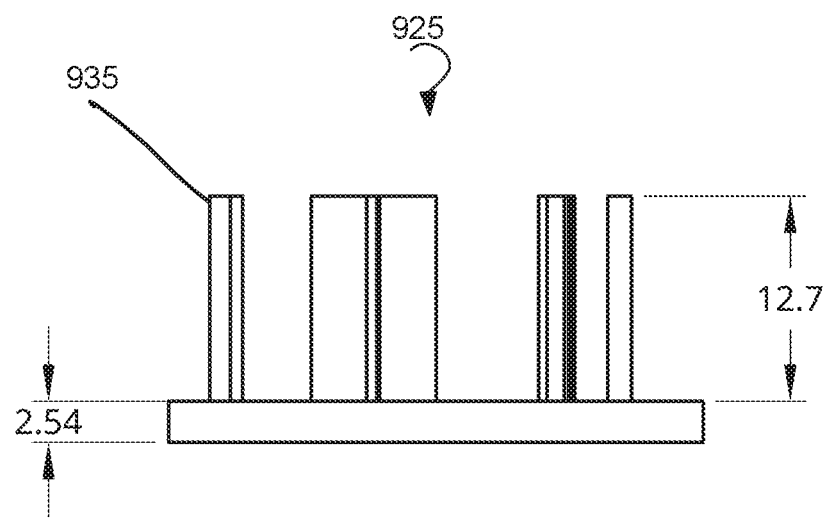
FIG. 12A depicts a side profile view of base plate and tabs.
Figure 12B:
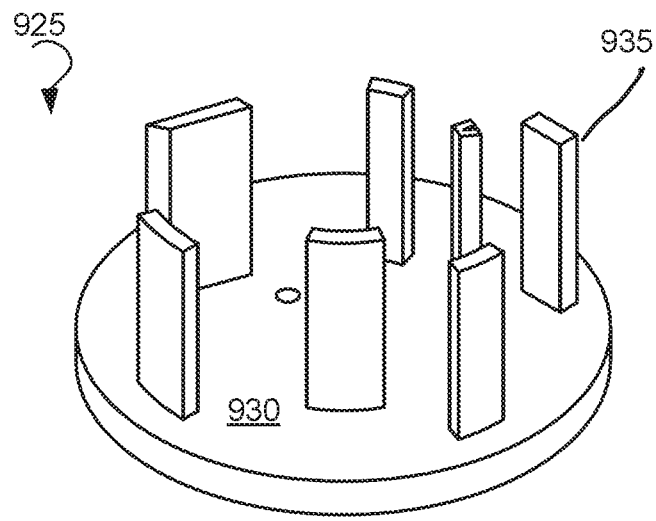
FIG. 12B depicts a top perspective view of base plate.

FIG. 12A depicts a side profile view of base plate 925 and tabs 935, with exemplary dimensions. In the figure, the height of the tallest tab 935 is 12.7 mm. In various embodiments, tabs 935 may be all of the same height, or may be of varying height. Tabs 935 may all have nonconductive tips, conductive bands at the tabs' base, and/or be slightly thicker at the base than the tip so sufficient force is required for mating. The height of the plate part of base plate 925 is depicted as 2.54 mm. FIG. 12B depicts another exemplary view of base plate 925. As would be understood by persons of ordinary skill in the art, actual dimensions in various embodiments may be larger or smaller than those noted in exemplary FIG. 12A.

Figure 13B:
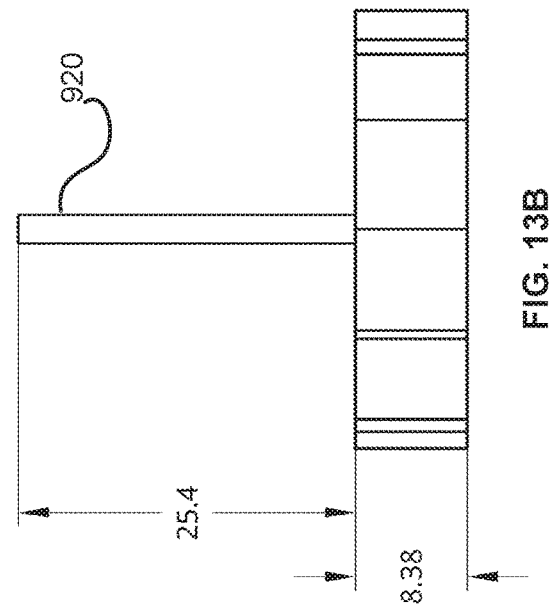
FIG. 13B depicts a side profile view of rotating hub.
Figure 13A:
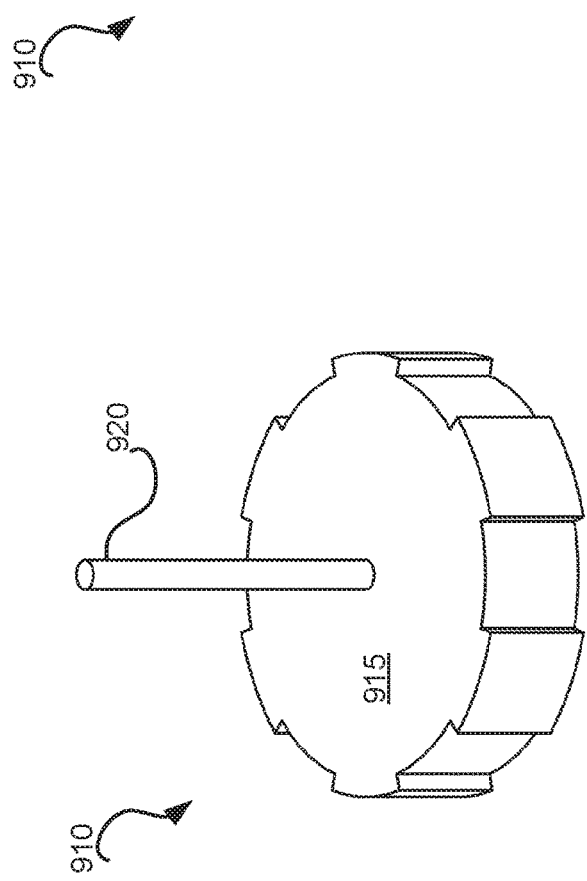
FIG. 13A depicts a top view of rotating hub.
Figure 13C:
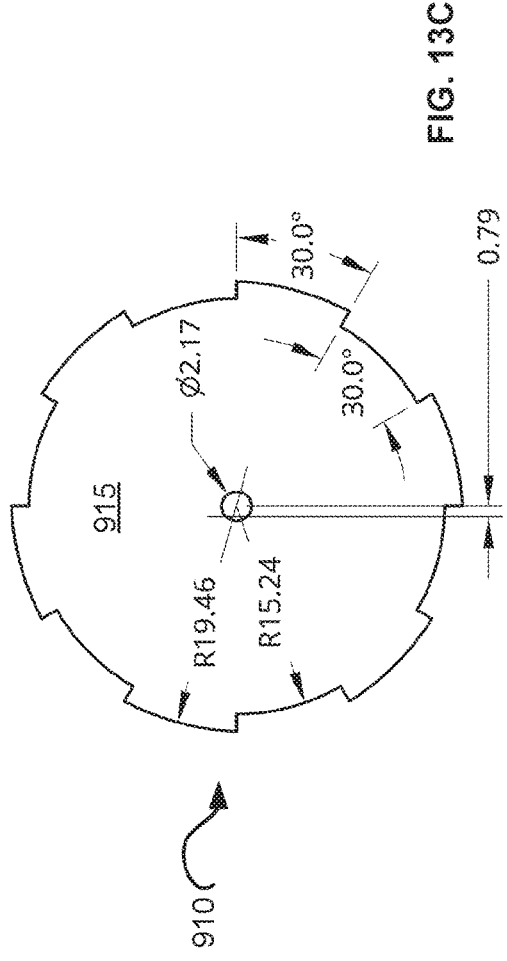
FIG. 13C depicts a top view of rotating hub

FIG. 13A depicts a top view of rotating hub 910 of the safe and arming system 900. The rotating hub 910 has a rotating hub top surface 915 and a center pole 920. FIG. 13B depicts a side profile view of rotating hub 910 and center pole 920, with exemplary dimensions. The height of center pole 920 is depicted as 25.4 mm, and the height of the base of rotating hub 910 is depicted as 8.38 mm. FIG. 13C depicts a top view of rotating hub 910 with exemplary dimensions. In the figure, center pole 920 has a diameter of 0.79 mm, and the opening of center pole has a diameter of 2.17 mm. Exemplary radii and angles are also noted on the figure. As would be understood by persons of ordinary skill in the art, actual dimensions in various embodiments may be larger or smaller than those noted in exemplary FIG. 13B and FIG. 13C.

In a different embodiment of a safe and arming system, tabs 935 can be configured to allow electrical current to flow when an electrical circuit is closed by alignment within holes 950 above/further from the propellant. Tabs 935 are oriented in line with holes 950 but would require the force generated by set-back pressure upon launch to complete mating and allow electricity to flow. In this way, instead of providing power through tabs 935 to a device, the tabs 935 are merely used to complete an electrical circuit that allows electricity to flow to operate the actuator motor that frees the projectile cap 130 to separate from the rest of the payload at or near the apex of flight (ballistic apogee).

In various embodiments, a destruction mechanism/protocol can be further included within DSRN package or cartridge 100. An arduino or similarly-controlled capacitor may be utilized to destroy electrical circuitry and zeroize equipment for military/LE application DSRN packages.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., "PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not necessarily be limited by such terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Example embodiments of the present disclosure are described herein with reference to illustrations of idealized embodiments (and intermediate structures) of the present disclosure. As such, variations from the shapes of the illustrations as a result, for example, of manufacturing techniques and/or tolerances, are to be expected. Thus, the example embodiments of the present disclosure should not be construed as necessarily limited to the particular shapes of regions illustrated herein, but are to include deviations in shapes that result, for example, from manufacturing.

Any and/or all elements, as disclosed herein, can be formed from a same, structurally continuous piece, such as being unitary, and/or be separately manufactured and/or connected, such as being an assembly and/or modules. Any and/or all elements, as disclosed herein, can be manufactured via any manufacturing processes, whether additive manufacturing, subtractive manufacturing and/or other any other types of manufacturing. For example, some manufacturing processes include three dimensional (3D) printing, laser cutting, computer numerical control (CNC) routing, milling, pressing, stamping, vacuum forming, hydroforming, injection molding, lithography and/or others.

Any and/or all elements, as disclosed herein, can include, whether partially and/or fully, a solid, including a metal, a mineral, a ceramic, an amorphous solid, such as glass, a glass ceramic, an organic solid, such as wood and/or a polymer, such as rubber, a composite material, a semiconductor, a nano-material, a biomaterial and/or any combinations thereof. Any and/or all elements, as disclosed herein, can include, whether partially and/or fully, a coating, including an informational coating, such as ink, an adhesive coating, a melt-adhesive coating, such as vacuum seal and/or heat seal, a release coating, such as tape liner, a low surface energy coating, an optical coating, such as for tint, color, hue, saturation, tone, shade, transparency, translucency, non-transparency, luminescence, anti-reflection and/or holographic, a photo-sensitive coating, an electronic and/or thermal property coating, such as for passivity, insulation, resistance or conduction, a magnetic coating, a water-resistant and/or waterproof coating, a scent coating and/or any combinations thereof.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and should not be interpreted in an idealized and/or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of illustrated technologies in addition to the orientation depicted in the accompanying drawings. For example, if a device in the accompanying drawings is turned over, then the elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

I claim:

1. A modular displaceable node system for deploying electronic equipment in a desired location via a displacement mechanism, the system comprising:
   a payload comprising:
   a signal relay node that relays at least one wireless communication signal through the air; and
   a projectile cap that encapsulates the signal relay node and is configured to separate from the payload and thereby provide electrical power to turn on the signal relay node;
      a projectile base that accompanies the payload and serves as a barrier when the payload is deployed via the displacement mechanism; and
      a removable cartridge casing containing a propellant, the removable cartridge casing surrounding the payload prior to deployment, and configured to physically separate from the payload by exerting force against the projectile base upon deployment of the signal relay node.

2. The modular displaceable node system of claim 1, wherein the signal relay node is configured to relay at least one communication signal when deployed via at least one frequency within an electromagnetic spectrum.

3. The modular displaceable node system of claim 1, wherein the signal relay node is configured to relay at least one communication signal when deployed via at least one cellular phone system.

4. The modular displaceable node system of claim 1, wherein the displacement mechanism is a 40 mm grenade launcher.

5. The modular displaceable node system of claim 1, wherein the displacement mechanism is a rescue flare gun.

6. The modular displaceable node system of claim 1, wherein the displacement mechanism is a mortar tube.

7. The modular displaceable node system of claim 1, wherein the displacement mechanism is a rocket launcher.

8. The modular displaceable node system of claim 1, wherein the displacement mechanism is an artillery piece.

9. The modular displaceable node system of claim 1 comprising:
   at least one battery to provide electrical power to the signal relay node when deployed.

10. The modular displaceable node system of claim 1 comprising:
    a safe and arming system that is activated after deployment to provide electrical power to the signal relay node.

11. The modular displaceable node system of claim 1 comprising:
    an aloft package secured to said signal relay node for keeping said signal relay node aloft for a period of time.

12. The modular displaceable node system of claim 1, wherein the signal relay node includes a transmitter for transmitting at least one of position, navigation, and timing data upon deployment.

13. A modular displaceable node system for deploying electronic equipment in a desired location via a displacement mechanism, the system comprising:
    a signal relay node that relays at least one wireless communication signal through the air upon deployment;
    a projectile cap that encapsulates the signal relay node and is configured to separate from the payload and thereby provide electrical power to turn on the signal relay node;
    a projectile base serves as a barrier between the signal relay node and at least a portion of the displacement mechanism when said node is deployed via the displacement mechanism; and
    a removable cartridge casing containing a propellant, the removable cartridge casing surrounding signal relay node, projectile cap and projectile base prior to launch, and configured to physically separate therefrom by exerting force against the projectile base upon deployment of the signal relay node.

* * * * *